July 15, 1958 G. C. MURRAY ET AL 2,842,787
LOADING RAMP
Filed Oct. 24, 1955
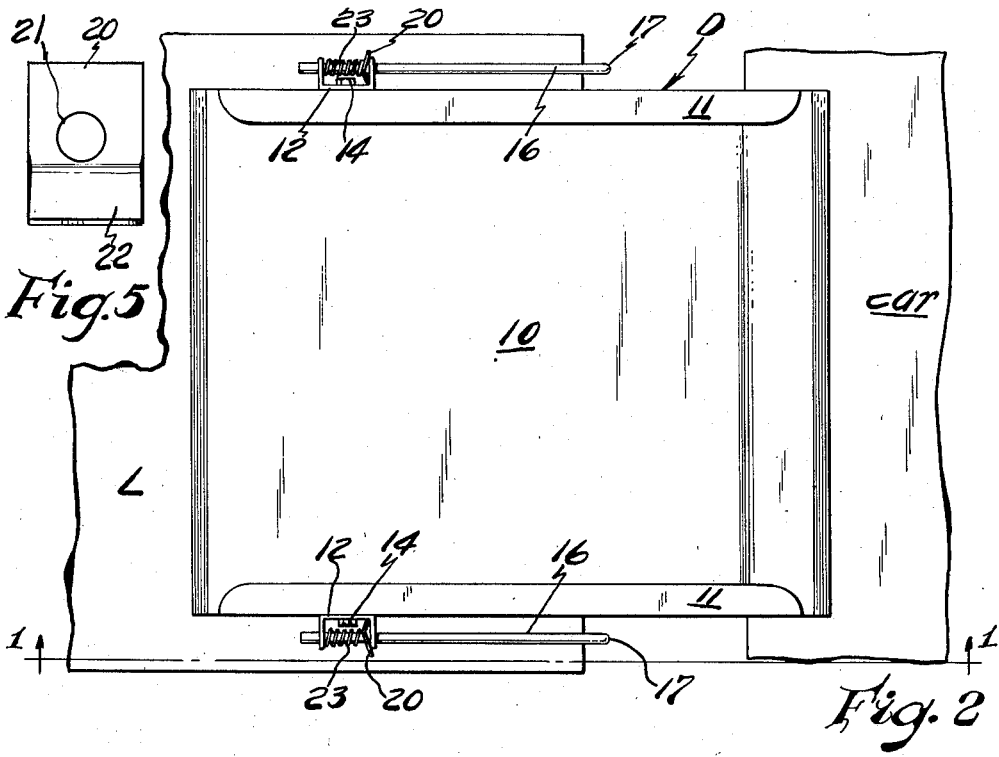
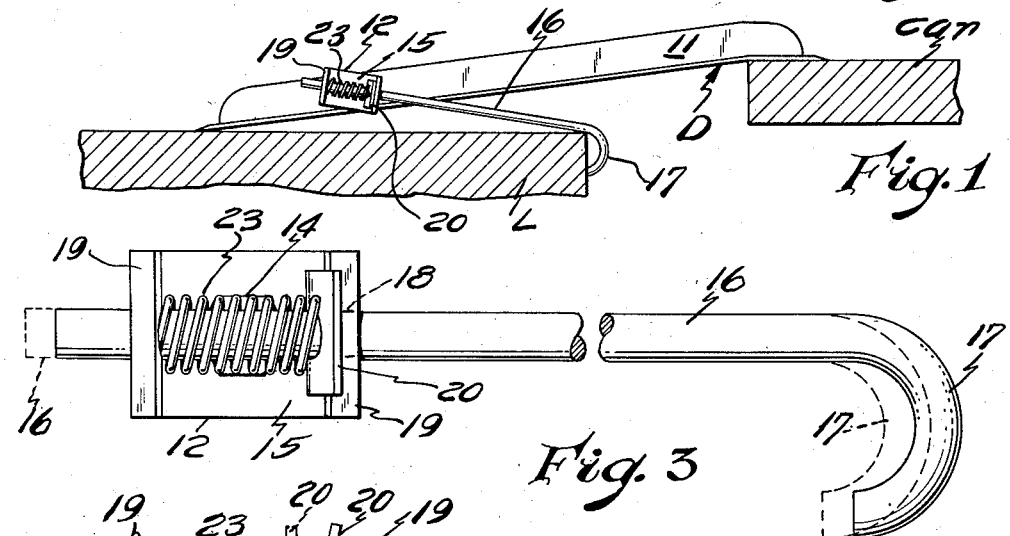
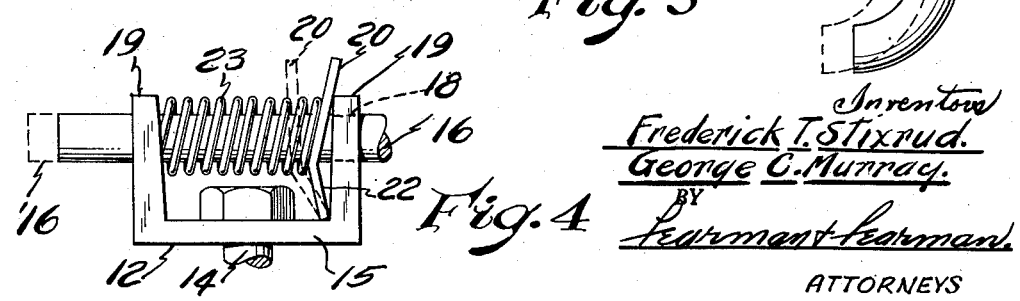
Inventors
Frederick T. Stixrud
George C. Murray
BY
Fearman & Fearman
ATTORNEYS

# United States Patent Office 2,842,787
Patented July 15, 1958

2,842,787
LOADING RAMP

George C. Murray, Essexville, and Frederick T. Stixrud, Pinconning, Mich., assignors to Maglin Inc., Pinconning, Mich.

Application October 24, 1955, Serial No. 542,322

1 Claim. (Cl. 14—72)

This invention relates to dockboards of the type adapted to provide a runway for trucks, both hand and power propelled between a loading platform and a freight car or other vehicle or from one platform to another.

One of the prime objects of the invention is to design a lightweight dockboard formed with raised side rails and adjustably mounted drop lock members for releasable engagement with the edge of a loading dock to insure against slippage, or creepage of the dockboard, thus eliminate accidents and frequent repositioning thereof.

Another object of the invention is to provide a novel dockboard of simple, practical and economical construction, which can be handled and positioned by but one man, and which has sufficient strength to support relatively heavy loads.

Another object is to provide simple, practical, and inexpensive, adjustably mounted drop lock members, independently adjustable with relation to each other, each of which can be easily and quickly adjusted, and which can be readily and quickly hooked and/or unhooked from the edge of the loading dock or other structure.

A further object is to provide a dockboard equipped with pivotally mounted longitudinally adjustable drop locks including spring pressed locking clips for securing the members in adjusted position.

With the above and other objects in view, the present invention consists in the combination and arrangement of parts, hereinafter more fully described, illustrated in the accompanying drawing, and more particularly pointed out in the appending claims, it being understood that changes may be made in the form, size, proportion and minor details of construction, without departing from the spirit, or sacrificing any of the advantages of the invention.

In the drawing:

Fig. 1 is a part sectional, side elevational view of a loading dock and carrier, taken on the line 1—1 of Fig. 2 with the loading dock in position to bridge the space between the dock and carrier.

Fig. 2 is a fragmentary top plan view thereof.

Fig. 3 is an enlarged side elevational view of the drop lock, the broken lines illustrating the longitudinal adjustment.

Fig. 4 is a fragmentary plan view showing the releasable locking means, the broken lines showing the locking clip in released position.

Fig. 5 is a face view of the locking clip.

Referring now more particularly to the drawing in which we have shown the preferred embodiment of our invention, the letter D indicates a dockboard such as is shown and described in the application for patent on Dockboards, filed January 14, 1954, Serial No. 404,113.

The dockboard comprises a tread plate 10 preferably formed of magnesium and has curb rails 11 welded or otherwise secured to the opposite edges of said plate to form a guard for the wheels of the vehicle traveling thereover.

Secured to the outer face of each curb rail 11 is a channel-shaped mounting block member 12, formed of magnesium, and pivotally secured to the side curbs by means of a bolt 14 as usual, said bolt extending through the web 15 of the mounting block 12.

The drop locks 16—16 are formed as clearly shown in Figs. 1 and 3 of the drawing, they are preferably formed of round stock, the one end being hook-shaped as at 17 for hooking over the edge of a loading dock L while the opposite end projects through aligned openings 18 provided in the legs 19 of the mounting block, said openings being of a diameter to permit the droplocks to freely slide therein.

The drop locks are held in position in the block 12 by means of a lock clip 20, bored as at 21, so that the shank of the drop lock freely passes therethrough, said clip being bent as at 22, so that when in position shown in Fig. 4 of the drawing, the marginal sharp edge of the opening 21 bites into the stock of the drop lock and securely holds it in position. A keeper spring 23 is mounted on the shank and is interposed between one of the channel legs 19 and the lock clip 20 to yieldably hold the clip in locked position.

When it is necessary to adjust the outward length of the drop lock, the workman merely forces the upper end of the lock clip 20 to position shown in broken lines in Fig. 4 of the drawing, this compresses the spring 23 and permits the drop locks to freely slide in the mounting blocks. To adjust in the opposite direction, no manipulation of the lock clip is necessary.

The edges of the loading platform are not always straight and true, consequently one of the drop locks must be adjusted to a shorter length than its companion in order to hold the board squarely in position and prevent creepage and tilting, etc., and this is easily accomplished in my instant construction, because each drop lock is independently adjustable with relation to the other.

From the foregoing description it will be obvious that we have perfected a very unique and efficient drop lock, and while in the instant application we have shown but one design, it is to be understood that various changes may be made in the structure herein disclosed, provided the means stated by the following claim or the equivalent of such stated means is employed.

We claim:

A loading ramp comprising: a longitudinally disposed floor including a front and rear end having raised curbs on the side edges thereof; a mounting block pivotally mounted on each side curb for swinging movement in a vertical plane; a slide bearing surface on each mounting block; a creep restraining drop lock member terminating in a free end having a portion for hooking over the edge of a loading dock slidably received by the said bearing surface on each block for sliding movement longitudinally in a forward and rearward direction to provide a pair of independent drop lock members which can be moved to different relative positions of extension so that the free end of each may be in engagement with a dock having an uneven front wall; a latch for each drop lock member having one end supported on the mounting block for the drop lock member and pivotally movable therewith, said latch having an aperture for receiving said drop lock member and being movable on the mounting block from a position in which the marginal edge of the aperture is substantially out of engagement with said drop lock member and does not restrict free sliding movement thereof in said bearing surface to a position in which the marginal edge of the aperture is in movement restricting engagement with said drop lock member; and keeper means exerting a force normally maintaining said latch in said latter position.

References Cited in the file of this patent
UNITED STATES PATENTS

| | | |
|---|---|---|
| 880,064 | Beyer | Feb. 25, 1908 |
| 935,545 | Pilcher | Sept. 28, 1909 |
| 1,652,243 | Huboux | Dec. 13, 1927 |
| 2,659,914 | Law | Nov. 24, 1953 |